March 20, 1956     E. E. SHELDON     2,739,258
SYSTEM OF INTENSIFICATION OF X-RAY IMAGES
Filed May 19, 1950     2 Sheets-Sheet 1
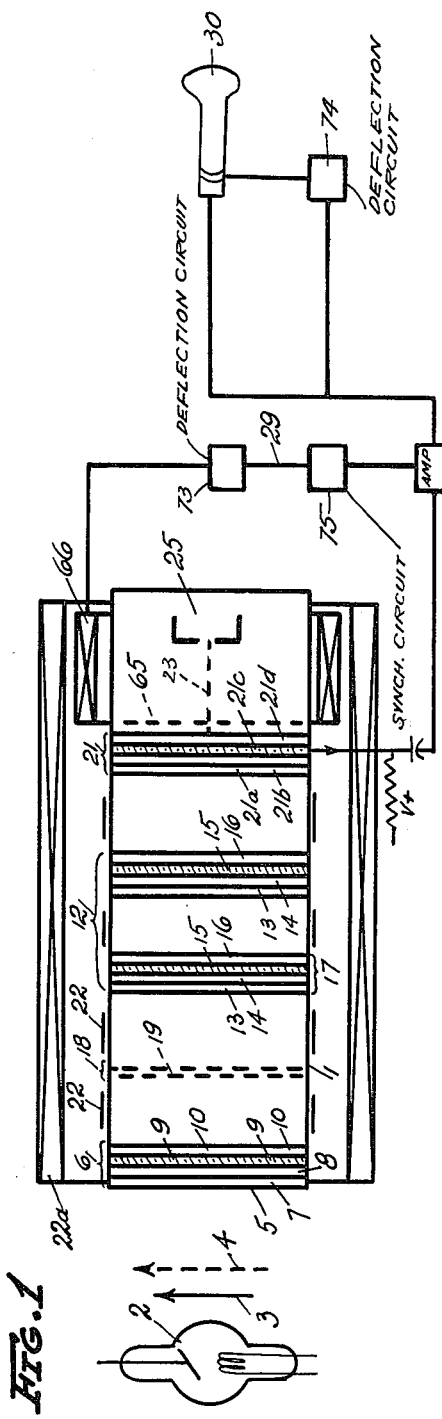
INVENTOR:
EDWARD E. SHELDON
BY: Julian J. Wittal,
his ATTORNEY.

March 20, 1956 — E. E. SHELDON — 2,739,258
SYSTEM OF INTENSIFICATION OF X-RAY IMAGES
Filed May 19, 1950 — 2 Sheets-Sheet 2
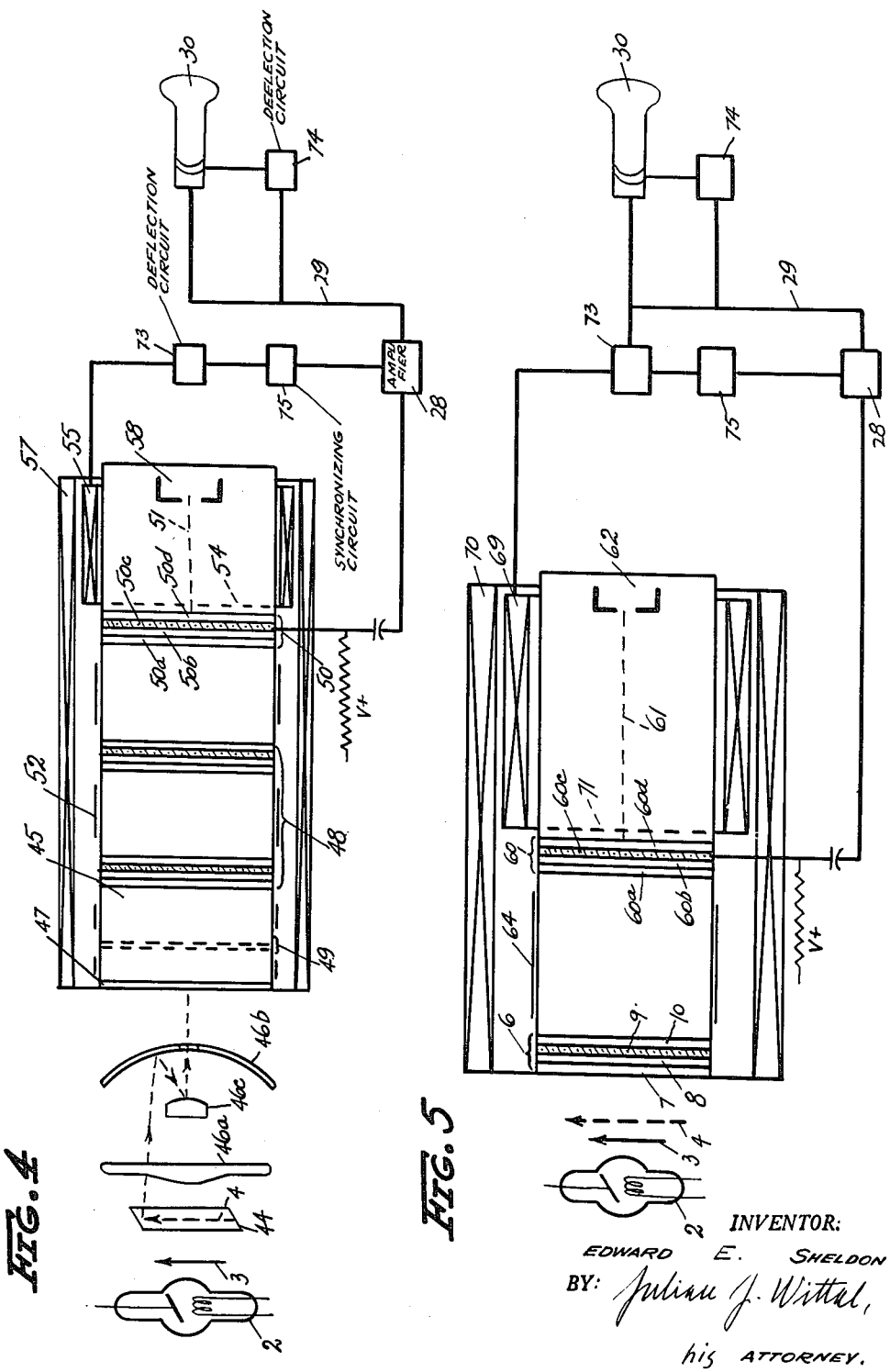
INVENTOR:
EDWARD E. SHELDON
BY: Julian J. Wittal,
his ATTORNEY.

2,739,258
SYSTEM OF INTENSIFICATION OF X-RAY IMAGES

Edward E. Sheldon, New York, N. Y.

Application May 19, 1950, Serial No. 162,908

7 Claims. (Cl. 313—65)

This invention relates to a method and system for intensifying and storing images of invisible radiations and refers more particularly to a method and device for intensifying and storing X-ray images, and also for images formed by irradiation by beams of atom particles such as electrons or neutrons.

One objective of this invention is to provide a method and system to produce intensified images for examination. The intensification will make is possible to overcome the inefficiency of the present fluoroscopic examination. At present illumination of the X-ray fluoroscopic image is of the order of 0.001–0.01 milli-lambert. At this level the human eye has to rely exclusively on scotopic (dark adaptation) vision which is characterized by tremendous loss of normal visual acuity in reference both to the detail and contrast.

Another objective of this invention is to make it possible to prolong the fluoroscopic examination, since it will be possible to reduce markedly the strength of radiation affecting the patient's body. Conversely the exposure time or energy necessary for examination using an invisible radiation may be considerably reduced.

Another objective of this invention is to provide a method and device to produce sharper and more contrasting images of invisible radiations than it was possible until now.

Another purpose of this invention is to provide the possibility of storing the invisible images and inspecting them for a desired length of time when wanted without further expenditure of invisible radiation.

The present intensifying devices concerned with reproduction of X-ray fluoroscopic images were completely unsatisfactory, as in the best of them amplification of the original image brightness of the order of 3 to 5 was achieved, while in order to obtain improvement in the visual acuity intensification of the brightness of the order of 1000 is obligatory. Without intensification of luminosity of at least of the order of 500–1000 the eye is confined to so-called scotopic vision at which it is not able to perceive definition and contrast of the fluoroscopic image. It is well known that intensification of the brightness of the X-ray fluoroscopic image cannot be achieved by increase of energy of the X-ray radiation as it will result in damage to the patient's tissues. Therefore, to obtain the objectives of this invention, a special X-ray sensitive pick-up tube had to be designed. This novel X-ray pick-up tube is characterized by elimination of the optical system which resulted in 20–30 fold gain in the light reaching the photocathode. This gain of incident light on photocathode allowed to activate the transmitting system, which before was not possible as with the amount of incident light available after passage through the focusing optical system the signal to noise ratio was too low for satisfactory results.

To accomplish the objectives of this invention a composite X-ray sensitive photocathode consisting of an extremely thin photoemissive layer, a transparent layer and an X-ray fluorescent or reactive layer, is positioned within novel X-ray sensitive television pick-up tube. This combination represents a basic improvement, as it results in twenty-thirty fold gain in light reaching the photoemissive layer. The importance of this construction is clear when it is considered that the most sensitive television pick-up tube has a threshold of operation at above 0.01 millilambert which cannot be provided by the energy of X-ray beam compatible with the patient's safety. It is therefore obvious that the elimination of the optical system disposed between the fluorescent screen and television system represents an important improvement in securing the necessary amount of light for operation of the X-ray pick-up tube. Still better results were obtained by the use of a very thin light reflecting layer, such as for aluminum deposited on the surface of the fluorescent layer of the composite screen, nearest the source of radiation in order to increase the transfer of light to the photoemissive layer. It is also very important to interpose between the fluorescent and photoemissive layers a very thin light transparent, chemically inactive separating layer.

The signal to noise ratio deciding the sharpness and contrast of the image was further improved by the use of a series of composite screens each consisting of an electron transparent light reflecting layer, electron fluorescent layer, chemically inactive light transparent layer, and of photoemissive layer, which screens are disposed within the X-ray pick-up tube in succeeding stages. The X-ray image is converted in said photocathode composite into photoelectron image. The photoelectron image is accelerated and focused by the electrical fields on the electron sensitive composite screen, whereby an intensified photoelectron image is produced, which again may be focused on the next electron sensitive composite screen, producing further intensification of the image.

Further intensification of the X-ray image was obtained by the use of one or plural electron multipliers disposed between the composite X-ray sensitive photocathode and intensifying screen of the X-ray sensitive pick-up tube. The photoelectron image having the pattern of the X-ray image emitted by the composite X-ray sensitive photocathode is accelerated by electric fields and focused on the secondary electron-emissive electrode, whereby an intensified electron image is produced.

In some instances it is advantageous to demagnify the electron image emitted by the composite X-ray sensitive photocathode before projecting it on the next composite screen or on the electron multiplier screen. The electron diminution of the image results in its intensification proportional to the linear decrease of its size. The intensified photoelectron image is stored in the composite target of the X-ray sensitive pick-up tube, for a predetermined period of time, then is scanned by electron beam and converted into video signals. Video signals are sent to amplifiers. By the use of variable mu amplifiers in one or two stages, intensification of video signals can be produced in a non-linear manner so that small differences in intensity of succeeding video signals can be increased one to ten times, producing thereby a corresponding gain of the contrast of the final visible image in receivers.

In some cases it may be necessary to include a special storage tube in the X-ray image intensifying system in order to overcome the flicker resulting from long frame time. In such case video signals are sent to the storage tube having a storage target and are deposited there by modulation of the electron scanning beam of said storage tube. The stored electrical charges having the pattern of X-ray images are released from the storage target after predetermined time by scanning it with another electric beam or by flooding it with light. The released electron image is converted again into video signals and sent to final receivers to produce visible image with desired intensification.

The invention will appear more clearly from the following detailed description when taken in connection with the accompanying drawings by way of example only preferred embodiments of the inventive idea.

In the drawings:

Fig. 1 shows a sectional diagrammatic view of a system for intensifying images of invisible radiations;

Fig. 2 shows an improved modification of said system having electron multipliers;

Fig. 3 represents a simplified modification of said system;

Fig. 4 represents a modification of said system using optical means therein; and Fig. 5 represents a modification of said system having a storage target.

Reference will now be made to Fig. 1 which illustrates new X-ray sensitive pick-up tube 1 to accomplish the purposes of the invention as outlined above. The X-rays 2 produce invisible X-ray image 4 of the examined body 3. The invisible X-ray image 4 penetrates through the face 5 of the X-ray sensitive pick-up tube and activates the composite screen 6 acting as a photocathode, which consists of a very thin X-ray transparent light reflecting and therefore is light impervious layer 7, such as e. g. of aluminum, of X-ray fluorescent layer 8, of chemically inactive light transparent barrier layer 9, and of photoemissive layer 10. The face 5 of the tube is of material transparent to radiation used for examination.

The fluorescent layer 8 and the photoemissive layer 10 should be correlated so that under the influence of the particular radiation used there is obtained a maximum photo-emissive effect. More particularly the fluorescent layer should be of a material having its greatest sensitivity to the type of radiation to be used and the photoemissive material likewise should have its maximum sensitivity to the wave length emitted by the fluorescent layer. Fluorescent substances that may be used are: zinc silicates, zinc selenides, zinc sulphide, calcium tungstate or $BaPbSO_4$ with or without activators. The satisfactory photoemissive material will be caesium oxide activated by silver, or caesium, potassium or lithium with antimony or bismuth. An extremely thin light transparent chemically inactive barrier layer 9 should separate the fluorescent 8 and photoemissive 10 layers. The separating layer 9 can be an exceedingly thin transparent to light film of mica, glass, silica, $ZnF_2$, metal or of a suitable plastic. The X-ray image is converted in the fluorescent layer 8 of the composite photocathode 6 into fluorescent image and then in the photoemissive layer 10 into a photoelectron image. The photoelectron image having the pattern of the X-ray image is accelerated by electric fields 22 and is focused by means of magnetic or electrostatic fields 22a on the first composite screen 13 of the image amplifying section 12 of the tube. The amplifying section 12 has one or a few successively arranged composite screens each of them consisting of an electron pervious light reflecting layer 13, of layer fluorescing 14 when irradiated by electrons, of chemically inactive barrier layer 15 transparent to fluorescent light and of photoemissive layer 16. Fluorescent substances which may be used for said composite screen are zinc silicates, zinc selenides, zinc sulphides, calcium tungstate or $BaPbSO_4$, with or without additional activators; also organic phosphors such as anthracene or naphthalene are suitable. The satisfactory photoemissive materials are caesium oxide activated by silver or caesium with antimony or with bismuth, or antimony with lithium or potassium. The barrier layer 15 between the fluorescent and the photoemissive surfaces can be very thin light transparent layer of mica, glass, $ZnF_2$, of silica, metal or of a suitable plastic. The electron pervious light reflecting layer 13 may be of aluminum or of silver. The photoelectron image from the photocathode 6 focused on the composite screen 17 causes fluorescence of its fluorescent layer 14 which activates the photoemissive layer 16 producing an intensified photoelectron image having the pattern of the original X-ray image. The intensified photoelectron image can be again focused on the next composite screen whereby its further intensification may be achieved.

In some applications it may be preferable to use separately or in conjunction with the amplifying section 12 the electron multiplier section 18 consisting of one or few stages of secondary electron multipliers 19 which serves to intensify further the electron image.

In such a case the photoelectron image from the composite photocathode 6 after acceleration is focused by means of electrostatic or magnetic fields 22a on the multiplier. This results in intensification of the electron image by secondary emission from the first stage 19 of the multiplier section. The secondary electrons emitted from the first stage and having the pattern of the X-ray image may be focused after acceleration on the second stage of the multiplier section, producing thereby further intensification of the electron image. The electron image produced by electron multiplier section of the tube is projected on the first composite screen 17 of amplifying section of the tube for its further intensification. The electron image produced by the amplifying section of the tube is focused on the composite target 21 producing therein pattern of electrical charges corresponding to the X-ray image.

In some instances, it is advantageous to demagnify the photoelectron image emitted by the composite photocathode 6 before projecting it on the composite screen 17. The electron diminution of the image is accomplished by means of electrostatic or magnetic fields which are well known in the art and therefore are omitted in order not to complicate the drawings.

The composite storage target 21 consists of an electron pervious, light reflecting layer 21a, of a layer 21b fluorescing when irradiated by electrons of chemically inactive layer 21c which is electrically conductive and transparent to fluorescent light and of photoconductive layer 21d. Fluorescent substances which may be used for the composite screen are zinc silicates, zinc selenides, zinc sulphide, calcium tungstate or $BaPbSO_4$, with or without additional activators. The satisfactory photoconductive materials are selenium, $Cu_2O$, germanium, thallium sulphide and lead sulphide or selenide. Many sulphides, selenides and oxides exhibit strong photoconduction and can be used for this purpose. The layer 21c between the fluorescent and photoconductive surfaces serves as a separating barrier and as a signal plate. It can be made of a very thin light transparent layer of a conductive metal or of any other transparent and conductive material. The electron pervious light reflecting layer 21a may be of aluminum or of silver. It is evident that the layer 21a being light reflecting is non-transmitting to light. The electron current image from the intensifying screen is focused on the composite target 21 and causes fluorescence of its fluorescent layer 21b which in turn produces changes in conductivity in the layer 21d according to the pattern of the original X-ray image. The storage target 21 is scanned by electron beam 23 from the electron gun 25. The electron gun is well known in the art and therefore does not need any further description. The scanning electron beam may be of a high velocity such as applied in the iconoscope or of a low velocity.

A low velocity scanning beam is used in the embodiment of the invention shown in Fig. 1 and it is controlled by the deflection yoke 66. The scanning beam striking the photoconductive layer 21d deposits electrons thereon and charges it to the potential of the cathode of the electron gun. The signal plate layer 21c is charged positively from an extraneous source of electrical power. The resistance of the photoconductive layer is great enough to prevent passage of charges from its scanned side to the positive signal plate. If however the photoconductive layer is illuminated, its resistance decreases proportionally to the intensity of the incident light and the time of illumination. This makes possible the flow of charges through the photoconductive layer and the scanned side of said layer becomes between successive scans 1-2 volts positive in relation to the potential of the cathode of the electron gun. During the next scan the electron beam neutralizes this positive charge on the photoconductive layer and produces thereby a video signal which flows through the signal plate layer 21c to the amplifiers 28. The amplified video signals are sent by coaxial cable 29 or by high frequency waves to the receiver of kinescope type 30 or facsimile type in which they are reconverted into visible images. In a close proximity to the scanned side of the photoconductive layer is disposed a mesh screen 65 which serves to provide an uniform field in front of the target 21.

In the improved form of this invention shown in Fig. 2, the composite target 21 in the X-ray pick-up tube 41 is scanned by a slow electron beam 23a from the electron gun 25a. The scanning electron beam is controlled by the deflection yoke 67 and focusing coil 22b. The scanning beam is modulated by the pattern of positive electrical charges on the photoconductive layer 21d. After neutralization of said charges the returning beam 24a carries video information. The returning electron beam strikes the first stage of the electron multiplier 26. The secondary electrons from the first stage of the multiplier strike the succeeding stage 27 around and the back of the first stage. This process is repeated in a few stages resulting in a marked multiplication of the original electron signals. The signal currents from the last stage of the multiplier are fed into television amplifiers and then sent by coaxial cable 29 by high frequency waves to the receivers of kinescope type 30 or facsimile type in which they are reconverted into visible images for inspection or for recording. The remaining parts of this pick-up tube 41 are the same as described above in Fig. 1.

In order to obtain amplification of contrast of the X-ray image, the amplifiers 28 are provided with variable mu tubes in one or two stages. Small differences in intensity of the succeeding video signals are increased by variable mu tubes in non-linear manner resulting in a gain of the contrast of the visible image in receivers. Instead of using all the electrons returning from the target as a source of video signals, a fraction of the returning beam which represents electrons of the scanning electron beam scattered by the target may be used for generation of video signals. In such a case an additional electrode is necessary in order to separate the group of scattered electrons from the group of electrons which are specularly reflected by the target. Another method of separation is to admit only the group of scattered electrons into electron multiplier 26.

A simplified form of this invention is shown in Fig. 3. In this embodiment of this invention the X-rays 2 produce invisible X-ray image 4 of the examined body 3. The invisible X-ray image 4 penetrates through the face 5 of the X-ray sensitive pick-up tube 42 and activates the composite screen 31 in the X-ray pick-up tube acting as a photocathode. The screen 31 consists of a very thin X-ray transparent light reflecting layer 31a such as of aluminum, of X-ray fluorescent layer 31b, of chemically inactive light transparent barrier layer 31c which is electrically conductive, and of photoconductive layer 31d. The face 5 of the tube is of material transparent to radiation used for examination.

The fluorescent layer 31b is the same as described above. The light transparent conducting layer 31c may be of metal. The photoconductive layer 31d may be of selenium, $Cu_2O$, germanium, thallium sulphide, lead sulphide or selenide. The X-ray image is focused on the composite photocathode 31 and causes fluorescence of its fluorescent layer 31b which in turn produces changes in conductivity in the layer 31d, according to the pattern of the original X-ray image. The photocathode 31 is scanned by the electron beam 23b from the electron gun 25b.

The scanning electron beam may be of a high velocity such as in the iconoscope or of the low velocity. A low velocity scanning beam is used in the embodiment of the invention shown in Fig. 3 and is controlled by the deflection yoke 68 and focusing coil 22c. The scanning beam striking the photoconductive layer 31d deposits electrons thereon and charges it to the potential of the cathode of the electron gun. The signal plate layer 31c is charged positively from an extraneous source of electrical power.

The resistance of the photoconductive layer is great enough to prevent passage of charges from its scanned side to the positive signal plate. If, however, the photoconductive layer is illuminated its resistance decreases proportionally to the intensity of the incident light and the time of illumination. This makes possible the flow of charges through the photoconductive layer and the scanned side of said layer becomes between successive scans 1-2 volts positive in relation to the potential of the cathode of the electron gun. During the next scan the electron beam neutralizes the positive charge on the photoconductive layer and produces thereby a video signal which flows through the signal plate layer 31c to the amplifiers. The amplified video signals are sent by coaxial cable 29 or by high frequency wave to the receivers of kinescope type 30 or facsimile type in which they are reconverted into visible images. In a close proximity to the scanned side of the photoconductive layer is disposed a mesh screen 65b which serves to provide an uniform electrical field in front of the target 31.

It is understood that instead of a composite photocathode described above (Fig. 1), an X-ray reactive layer of electron emissive type may be used as a photocathode. Lead, gold or uranium are suitable for this purpose. In such case the electron image from the X-ray reactive layer is focused on the amplifying screen 17 by means of magnetic or electrostatic fields.

In another alternative of this invention (Fig. 4) the X-ray image is converted into a visible fluorescent image in the fluorescent screen 44 positioned outside of the X-ray pick-up tube 45 and is projected by the optical system 46 into photocathode 47 of the X-ray pick-up tube 45. As explained above the loss of light caused by the use of the optical system makes it impossible to activate the most sensitive television pick-up tube by the X-ray fluorescent image of the human body. By the use of the reflective optical system there is obtained five-eight fold gain in light reaching the photocathode of the pick-up tube from the fluorescent screen 44. This gain being still not sufficient to activate the standard television pick-up tube, a novel pick-up tube was designed. The novel pick-up tube 45 is characterized by the amplifying section 48 consisting of a single or plural composite screen and of electron multiplying section 49 which both were described in detail above. The X-ray fluorescent image is projected by the reflective optical system 46 which in this particular case consists of an aspherical correction plate 46a, of a spherical concave mirror 46b with an aperture and of auxiliary plane or convex spherical mirror 46c, onto photocathode 47 to be converted there into photoelectron image.

It is to be understood that many various forms of the optical system, such as Maksutov's, Schmidt's or one with a meniscus lens may be used for this purpose and they all come within the scope of this invention.

The photoelectron image after multiplication in the multiplier section 49 and after intensification in the amplifying section 48 of the pick-up tube is accelerated by means of electric fields 52 and is focused by means of magnetic or electrostatic fields 57 on the composite target 50, consisting of a light reflecting layer 50a, a fluorescent layer 50b, light transparent conducting layer 50c and photoconducting layer 50d. The target is scanned by electron beam 51 which produces video signals as was explained above and illustrated in Figs. 1 and 2. The electron beam 51 is controlled by deflection yoke 55. Video signals are fed into amplifier system 28 and therefrom to the immediate or remote receivers to produce visible image with desired luminosity and gain in contrast. Mesh screen 54 provides uniform field in front of the target.

The storage of X-ray images which was another purpose of this invention may be obtained by means of any of the novel X-ray pick-up tubes shown in Figs. 1, 2, 3 and 4. Normally, in the pick-up tube efforts are made to insure that picture signals are completely erased each scanning cycle, if the fuzzing of moving objects is to be avoided. However, this defect for conventional television is exactly what is necessary for storage of X-ray images. My storage tube shows this time lag as a result of a very high target capacity in combination with a low velocity and intensity scanning beam. These are the conditions which cause a long time constant for discharge of a condenser. The composite storage targets are condensers charged positively by the photoconduction and discharged by the scanning beam current. The target potential builds up proportionately to the time of light exposure. The slope of the target charging curve is determined by the capacity of the target and by the photoconduction. Therefore the only modifications necessary in order to use the X-ray pick-up tube 1, 41, 42 or 45 for the storage of X-ray images are to increase capacity of their composite targets 21, 31, 50 and 60 in order to allow a storage of large electrical charges and to decrease intensity of their scanning electron beams. The capacity of the composite target may be increased by using a photoconductive layer of a high resistance such as specially prepared selenium. The change in intensity of the scanning electron beam requires only adjustment of the electron gun.

The preferred embodiment of a system for intensifying and storing of X-ray images is shown in Fig. 5. The composite photocathode 6 may be the same as shown in Fig. 1. An electron image having the pattern of the X-ray image is produced by said photocathode, then is accelerated by electric fields 64 and is focused by the magnetic or electrostatic fields 70 on the composite storage target 60.

The storage target 60 consists of a light reflecting layer 60a, fluorescent layer 60b, light transparent conductive layer 60c and a photoconductive layer 60d. The latter layer in order to have a good storage for charge images must have a big resistance and must have a minimum thickness compatible with the sharpness of images. Specially prepared for this purpose ZnS, CdS, CdSe or selenium are suitable for this purpose. The electron gun 62 is designed to produce the scanning electron beam of the lowest intensity compatible with generation of video signals of adequate signal to noise ratio. The electron image from the photocathode 6 is converted in the composite storage target 60 in a stored charge image. The scanning electron beam 61 is controlled by the deflection yoke 69. When striking the photoconductive layer 60d it produces video signals as was explained above. These video signals have the pattern of the original X-ray image and may be reproduced in receivers in a visible form for reading. The dissipation of the stored charge image by the action of the scanning electron beam in this construction is a slow process and the image may be read for a few minutes.

The action of the deflecting circuits 73 and of electron gun 62 is of intermittent character. At the time of the X-ray exposure they are inactive. When the stored X-ray image is to be read they are activated, so that the electron beam 61 can scan the photoconductive layer 60d.

After the examination of the X-ray image has been concluded, the composite storage target 60 has to be restored to its original condition before the next X-ray image can be stored. The photoconductive layer 60d at the end of the reading has remaining positive charges thereon. In order to neutralize these charges, I spray it with the electron beam from the gun 62 with velocity at which secondary electron emission ratio of the photoconductive layer is below unity. In this way the storage target can be immediately restored to the original condition.

While I have shown a preferred embodiment of my invention, it is to be understood that changes and variations may be resorted to in the elements, combination and construction of my invention, and I reserve my rights to such changes and variations as are within the spirit of this specification, and the scope of the claims hereunto appended.

Having thus described my invention I claim as new and desire to protect by Letters Patent of the United States:

1. An invisible image sensitive vacuum tube comprising in combination a composite screen having a fluorescent layer for receiving an image and converting said image into a fluorescent light image and a photoconductive layer for receiving said light image and converting said image into a pattern of electrical conductivity changes having the pattern of said image a light transparent separating layer of conducting type between said fluorescent layer and said photoconductive layer, a source of electrons for producing a slow electron beam and means for scanning said composite screen with said electron beam and means for converting said conductivity pattern into video signals.

2. In a device as defined in claim 1, having in addition an element transparent to invisible radiation and impervious to visible light mounted adacent said fluorescent layer on the side facing said image.

3. An invisible image sensitive vacuum tube comprising in combination a composite photocathode having a fluorescent layer for receiving an image and converting said image into a fluorescent image and a photoconductive layer for receiving said fluorescent image and converting said image into a pattern of electrical conductivity changes having the pattern of said image, a light transparent separating layer of conducting type between said fluorescent layer and said photoconductive layer, an electron gun for producing an electron beam, means for scanning said conductivity pattern with said electron beam, and means for converting said conductivity pattern into video signals, said last means being connected to said light transparent conducting layer.

4. A composite screen comprising an ionizing radiation reactive layer for receiving said radiation and a photoconductive continuous and planar layer, said photoconductive layer having one surface exposed.

5. A composite screen comprising an X-ray reactive layer for receiving X-rays, a photoconductive layer, said photoconductive layer having a planar shape one surface exposed, and a light transparent layer having the property of electrical conductivity in contact with said photoconductive layer.

6. A composite screen comprising luminescent means, light transparent layer having the property of electrical conductivity in contact with said luminescent means and photoconductive layer having one surface in contact with said light transparent layer and the other surface exposed.

7. A composite screen comprising a light impervious layer, luminescent means mounted adjacent to said light impervious layer, light transparent layer having the property of electrical conductivity in contact with said luminescent means and a photoconductive layer having a continuous surface.

References Cited in the file of this patent
UNITED STATES PATENTS 2,156,813     Kautz     May 2, 1939
2,198,479     Langmuir     Apr. 23, 1940

(Other references on following page)

| | | | | | |
|---|---|---|---|---|---|
| 2,219,113 | Ploke | Oct. 22, 1940 | 2,523,132 | Mason et al. | Sept. 19, 1950 |
| 2,234,806 | Ploke | Mar. 11, 1941 | 2,527,913 | Cahen | Oct. 31, 1950 |
| 2,258,294 | Lubszynski et al. | Oct. 7, 1941 | 2,555,423 | Sheldon | June 5, 1951 |
| 2,303,930 | Gray | Dec. 1, 1942 | 2,555,424 | Sheldon | June 5, 1951 |
| 2,344,042 | Kallmann et al. | Mar. 14, 1944 | 2,603,757 | Sheldon | July 15, 1952 |
| 2,404,098 | Schade | July 16, 1946 | 2,690,516 | Sheldon | Sept. 28, 1954 |